(12) United States Patent
Tyshchenko et al.

(10) Patent No.: US 10,142,608 B2
(45) Date of Patent: Nov. 27, 2018

(54) ELECTRONIC APPARATUS AND METHOD FOR PROCESSING THREE-DIMENSIONAL INFORMATION USING IMAGE

(71) Applicant: SAMSUNG ELECTRONICS CO., LTD., Suwon-si, Gyeonggi-do (KR)

(72) Inventors: Maksym Tyshchenko, Kyiv (UA); Gennadiy Kis, Kiev (UA)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 33 days.

(21) Appl. No.: 15/314,365

(22) PCT Filed: Jul. 8, 2014

(86) PCT No.: PCT/KR2014/006101
§ 371 (c)(1),
(2) Date: Nov. 28, 2016

(87) PCT Pub. No.: WO2016/006728
PCT Pub. Date: Jan. 14, 2016

(65) Prior Publication Data
US 2017/0201735 A1    Jul. 13, 2017

(51) Int. Cl.
*G06K 9/00*      (2006.01)
*H04N 13/128*   (2018.01)
(Continued)

(52) U.S. Cl.
CPC .............. *H04N 13/128* (2018.05); *G06T 7/50* (2017.01); *G06T 7/571* (2017.01); *G06T 13/00* (2013.01);
(Continued)

(58) Field of Classification Search
None
See application file for complete search history.

(56) References Cited

U.S. PATENT DOCUMENTS

2010/0238161 A1 * 9/2010 Varga ................. G06T 17/05
345/419
2010/0287511 A1   11/2010 Meier et al.
(Continued)

FOREIGN PATENT DOCUMENTS

| JP | 2012-103743 | 5/2012 |
| KR | 10-2013-0122660 | 11/2013 |
| KR | 10-2014-0002567 | 1/2014 |

OTHER PUBLICATIONS

International Search Report for PCT/KR2014/006101, dated Mar. 20, 2015, 4 pages.

*Primary Examiner* — Hadi Akhavannik
(74) *Attorney, Agent, or Firm* — Nixon & Vanderhye, P.C.

(57) ABSTRACT

According to various embodiments, an electronic apparatus may comprise: a camera module for acquiring an image of an object; a display module; and a three-dimensional space determination module for acquiring three-dimensional model information on at least a part of a space of an object included in an image photographed through the camera module, acquiring altitude information on the at least a part of the space on the basis of the three-dimensional model information, determining at least one feature region located in the at least a part of the space on the basis of a change of the altitude information, and displaying a visual effect for a movement of the object through the display module, on the basis of the three-dimensional model information and the feature region. Other embodiments are available.

19 Claims, 10 Drawing Sheets

(51) Int. Cl.
*G06T 7/50* (2017.01)
*H04N 13/207* (2018.01)
*H04N 13/271* (2018.01)
*H04N 13/275* (2018.01)
*G06T 15/08* (2011.01)
*G06T 19/20* (2011.01)
*G06T 13/00* (2011.01)
*G06T 7/571* (2017.01)

(52) U.S. Cl.
CPC ............. *G06T 15/08* (2013.01); *G06T 19/20* (2013.01); *H04N 13/207* (2018.05); *H04N 13/271* (2018.05); *H04N 13/275* (2018.05); *G06T 2207/10028* (2013.01); *G06T 2207/20036* (2013.01); *G06T 2207/20076* (2013.01); *G06T 2219/2021* (2013.01)

(56) References Cited

U.S. PATENT DOCUMENTS

| | | | |
|---|---|---|---|
| 2012/0188342 A1 | 7/2012 | Gervautz et al. | |
| 2014/0002493 A1* | 1/2014 | Mitchell | G06T 13/20 345/633 |
| 2014/0092005 A1 | 4/2014 | Anderson et al. | |
| 2014/0184749 A1* | 7/2014 | Hilliges | G01S 17/89 348/47 |

\* cited by examiner

ELECTRONIC APPARATUS AND METHOD FOR PROCESSING THREE-DIMENSIONAL INFORMATION USING IMAGE

This application is the U.S. national phase of International Application No. PCT/KR2014/006101 filed 8 Jul. 2014, which designated the U.S., the entire contents of which is hereby incorporated by reference.

TECHNICAL FIELD

Various embodiments of the present invention relate to a method of processing three-dimensional information by using images and an electronic device adapted to the method.

BACKGROUND ART

Electronic devices may obtain images of subjects by using the built-in camera. In order to provide two-dimensional images of subjects and three-dimensional visual effects related to subjects, the obtained images may be processed in various modes in electronic devices. Electronic devices may simultaneously obtain a plurality of images of a particular subject by using a plurality of lenses and may re-configure the three-dimensional information about the subject by using the difference between the obtained images. Electronic devices may implement and display three-dimensional visual effects of a subject by using the three-dimensional information on the screen.

DISCLOSURE OF INVENTION

Technical Problem

Conventional systems require a great number of operations to re-configure three-dimensional information related to a subject, based no two-dimensional images of the subject. Therefore, it has taken conventional electronic devices a relative large amount of time to perform the operations because of the limited resources. In order to re-configure three-dimensional information from two-dimensional images of subjects and to provide a visual effect showing a three-dimensional interaction between a particular object and the other objects in the three-dimensional space, electronic devices need to process the three-dimensional information within a relatively short period of time.

When electronic devices are equipped with a mono-scope camera, they need a method of re-configuring three-dimensional information related to subjects from a plurality of two-dimensional images taken through the single lens.

Solution to Problem

In accordance with an embodiment of the present invention, the present invention provides an electronic device including: a camera module for obtaining images of a subject; a display module; and a three-dimensional (3-D) space determining module for: obtaining three-dimension (3-D) model information about at least part of a space of the subject included in an image taken by the camera module; obtaining altitude information about the at least part of a space based on the 3-D model information; identifying at least one characteristic area located at the at least part of a space based on variation of the altitude information; and displaying a visual effect related to movement of an object on the display module, based on the 3-D model information and the characteristic area.

Advantageous Effects of Invention

The present invention has been made in view of the above problems, and provides a method and an electronic device that efficiently re-configure three-dimensional information related to subjects from two-dimensional images at a relatively high rate in operation despite the limited resources in the electronic device.

The present invention further provides a method and an electronic device that obtain three-dimensional information related to subjects from a plurality of two-dimensional images taken through a mono-scope camera.

BRIEF DESCRIPTION OF DRAWINGS

The features and advantages of the invention will become more apparent from the following detailed description in conjunction with the accompanying drawings, in which.

MODE FOR THE INVENTION

Figure 1:
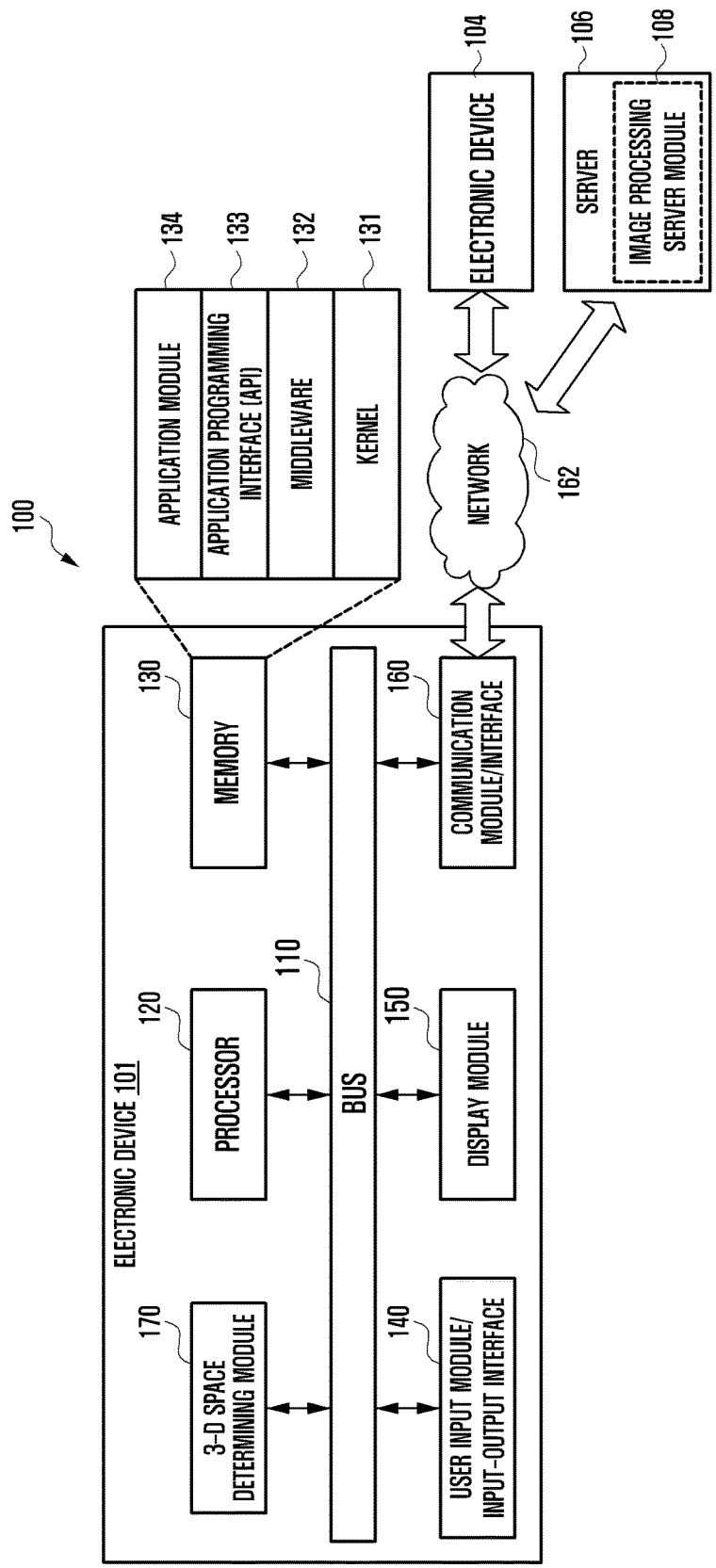
FIG. 1 illustrates a network environment including an electronic device according to various embodiments of the present invention.

Hereinafter, the present disclosure will be described with reference to the accompanying drawings. The present disclosure may have various embodiments, and modifications and changes may be made therein. Therefore, the present invention will be described in detail with reference to particular embodiments shown in the accompanying drawings. However, it should be understood that there is no intent to limit the present disclosure to the particular forms, and the present disclosure should be construed to cover all modifications, equivalents, and/or alternatives falling within the spirit and scope of the present disclosure. In describing the drawings, similar elements are designated by similar reference numerals.

As used in the present disclosure, the expression "include" or "may include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "or" includes any or all combinations of words enumerated together. For example, the expression "A or B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present invention are merely for the purpose of describing particular embodiments and are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a communication function. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smartwatch).

According to some embodiments, the electronic device may be a smart home appliance with a communication function. The smart home appliance as the electronic device, for example, may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic devices may include at least one of various medical devices (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) in a shop.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to the present disclosure may be a combination of one or more of the aforementioned various devices. Further, the electronic device according to the present disclosure may be a flexible device. Further, it will be apparent to those skilled in the art that the electronic device according to the present disclosure is not limited to the aforementioned devices.

Hereinafter, an electronic device according to various embodiments of the present disclosure will be discussed with reference to the accompanying drawings. The term "a user" as used in various embodiments may refer to any person who uses an electronic device or any other device (e.g., an artificial intelligence electronic device) using an electronic device.

FIG. 1 illustrates a network environment 100 including an electronic device 101 according to various embodiments of the present disclosure. Referring to FIG. 1, the electronic device 101 may include a bus 110, a processor 120, a memory 130, an input/output interface 140, a display 150, a communication interface 160, and a 3-D space determining module 170.

The bus 110 may be a circuit interconnecting the aforementioned components and transmitting communication (e.g., a control message) between the aforementioned components.

The processor 120, for example, may receive instructions from the aforementioned components (e.g., the memory 130, the input/output interface 140, the display 150, the communication interface 160, and the 3-D space determining module 170) other than the processor 120 through the bus 110, decode the received instructions, and perform operations or data processing according to the decoded instructions.

The memory 130 may store instructions or data received from or generated by the processor 120 or other components (e.g., the input/output interface 140, the display 150, the communication interface 160, and the 3-D space determining module 170). The memory 130 may include programming modules, for example, a kernel 131, middleware 132, an application programming interface (API) 133, and applications 134. Each of the programming modules as described above may be formed by software, firmware, hardware, or a combination of two or more thereof.

The kernel 131 may control or manage system resources (e.g., the bus 110, the processor 120, and the memory 130) used to execute operations or functions implemented in the remaining other programming modules, for example, the middleware 132, the API 133, and the applications 134. Further, the kernel 131 may provide an interface that allows the middleware 132, the API 133, or the applications 134 to access and control or manage individual components of the electronic device 101.

The middleware 132 may serve to mediate between the API 133 or the applications 134 and the kernel 131, that is, allow the API 133 or the application 134 to communicate and exchange data with the kernel 131. Further, the middleware 132 may perform control (e.g., scheduling or load balancing) for task requests received from the applications 134 by using, for example, a method of assigning a priority for use of the system resource (e.g., the bus 110, the processor 120, or the memory 130) of the electronic device 101 to at least one of the applications 134.

The API 133 is an interface for allowing the applications 134 to control functions provided by the kernel 131 and the middleware 132, and may include at least one interface or function (e.g., instruction) for, for example, file control, window control, image processing, or text control.

According to various embodiments, the applications 134 may include an SMS/MMS application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the applications 134 may include an application associated with information exchange between the electronic device 101 and an external electronic device (e.g., the electronic device 104). The application associated with information exchange, for example, may include a notification relay application for transferring specific information to the external electronic device or a device management application for managing the external electronic device.

For example, the notification relay application may include a function of transferring notification information, generated in another application of the electronic device 101 (e.g., the SMS/MMS application, the e-mail application, the health care application, or the environmental information application), to an external electronic device (e.g., the electronic device 104). Additionally or alternatively, the notification relay application, for example, may receive notification information from an external electronic device (e.g., the electronic device 104) and provide the received notification information to a user. The device management application, for example, may manage (e.g., install, remove, or update) a function for at least a part of an external electronic device (e.g., the electronic device 104) communicating with the electronic device 101 (e.g., a function of turning on/off an external electronic device itself (or some components thereof) or adjusting the brightness (or resolution) of a display), an application running on the external electronic device, or a service provided in the external electronic device (e.g., a calling or messaging service).

According to various embodiments, the applications 134 may include an application specified according to the attribute (e.g., type) of an external electronic device (e.g., the electronic device 104). For example, when the external electronic device is an MP3 player, the applications 134 may include an application associated with music playback. Similarly, when the external electronic device is a mobile medical device, the applications 134 may include an application associated with health care. According to an embodiment, the applications 134 may include at least one of an application assigned to the electronic device 101 and an application received from an external electronic device (e.g., the server 106 or the electronic device 104).

The input/output interface 140, for example, may transfer instructions or data, input from a user through an input/output device (e.g., a sensor, a keyboard, or a touch screen), to the processor 120, the memory 130, the communication interface 160, or the 3-D space determining module 170 through the bus 110. For example, the input/output interface 140 may provide the processor 120 with data corresponding to a user's touch input through a touch screen. Further, the input/output interface 140 may, for example, receive instructions or data from the processor 120, the memory 130, the communication interface 160, or the 3-D space determining module 170 through the bus 110 and output the received instructions or data through the input/output device (e.g., a speaker or a display). For example, the input/output interface 140 may output voice data processed by the processor 120 to a user through a speaker.

The display 150 may display various pieces of information (e.g., multimedia data or text data) to a user.

The communication interface 160 may establish communication between the electronic device 101 and an external electronic device (e.g., the electronic device 104 or the server 106). For example, the communication interface 160 may be connected to the network 162 through wireless or wired communication and thereby communicate with the external device. The wireless communication, for example, may include at least one of wireless fidelity (WiFi), Bluetooth (BT), near field communication (NFC), a global positioning system (GPS), and cellular communication (e.g., LTE, LTE-A, CDMA, CDMA, UMTS, WiBro, or GSM). The wired communication, for example, may include at least one of a universal serial bus (USB), a high definition multimedia interface (HDMI), recommended standard 232 (RS-232), and a plain old telephone service (POTS).

According to an embodiment, the network 162 may be a telecommunications network. The telecommunications network may include at least one of a computer network, the Internet, the Internet of things, and a telephone network. According to an embodiment, a protocol (e.g., a transport layer protocol, a data link layer protocol, or a physical layer protocol) for communication between the electronic device 101 and an external device may be supported by at least one of the applications 134, the application programming interface 133, the middleware 132, the kernel 131, and the communication interface 160.

According to an embodiment of the present invention, the server 106 performs at least one of the operations (or functions) implemented in the electronic device 101, thereby supporting the electronic device 101. For example, the server 106 may include an image processing server module 108 for supporting a three-dimensional (3-D) space determining module 170 implemented in the electronic device 101. The image processing server module 108 may include at least one component of the 3-D space determining module 170 so that it can perform the corresponding operation of the 3-D space determining module 170 (e.g., it can execute the corresponding operation for the module 170).

The 3-D space determining module 170 may obtain information from other components (e.g., the processor 120, memory 130, input/output interface 140 or communication interface 160), process part of the information and provide the processed information to the user in various ways. For example, when the 3-D space determining module 170 receives an instruction for determining at least part of a 3-D space for a subject, it obtains images of the subject through a camera and information about the location or focus of the camera and processes the obtained information with or without the use of the processor 120 to determine at least part of a 3-D space for the subject. The determined result may be used by the 3-D space determining module 170 or the other function modules of the electronic device 101. According to an embodiment, at least one configuration of the 3-D space determining module 170 may be included in the server 106 (e.g., the image processing server module 108), so that at least one operation implemented in the 3-D space determining module 170 can be supported by the server 106.

According to various embodiments, the 3-D space determining module 170 may obtain altitude information about a 3-D space of a subject. The 3-D space determining module 170 may determine a 3-D space related to a subject, as various characteristic areas, based on the obtained altitude information (e.g., altitude map). According to an embodiment, the 3-D space determining module 170 may determine an area in a 3-D space related to a subject, which rapidly increases in altitude compared with the adjacent area, as an obstacle, and which gradually increases in altitude compared with the adjacent area, as an uphill. The 3-D space determining module 170 may determine an area in a 3-D space related to a subject, which rapidly decreases in altitude compared with the adjacent area, as a pit, and which gradually decreases in altitude compared with the adjacent area, as a downhill. According to an embodiment, the extent of whether the change of altitude (or the slop) is steep or gentle may be set to a plurality of levels, e.g., unchanged, gentle, steep, etc., based on a threshold (e.g., the difference or continuity in altitude between unit planes in an altitude map) or a degree of the change of altitude. According to an embodiment, the 3-D space determining module 170 may determine a 3-D space related to a subject as only one of a plurality of characteristic areas, e.g., an obstacle or a pit, in order to enhance the process rate. It should be understood that this is an embodiment and the present invention is not limited thereto. It should be understood that there may be many modifications from the embodiment.

Figure 2:
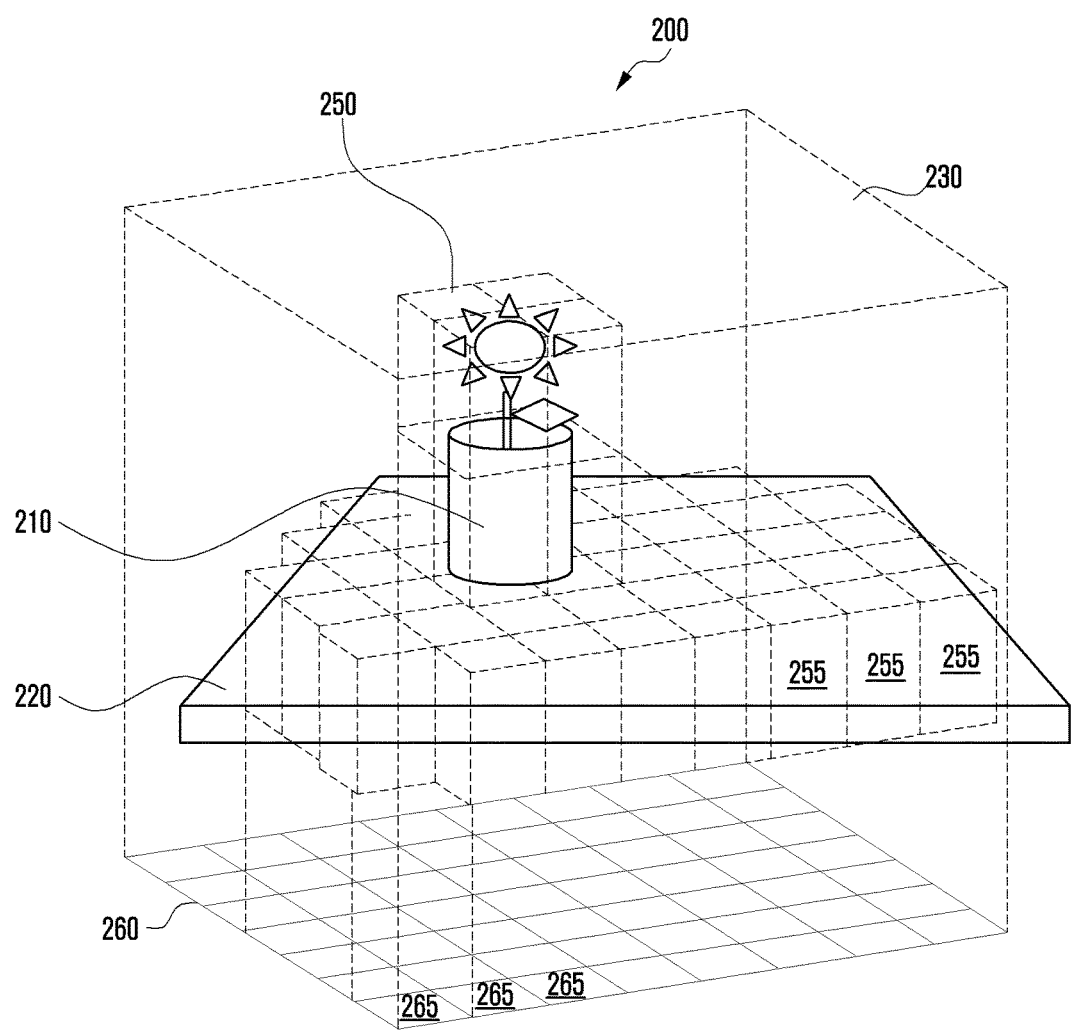
FIG. 2 illustrates a diagram that describes a three-dimensional space related to a subject according to various embodiments of the present invention.

FIG. 2 illustrates a diagram 200 that describes a three-dimensional space related to a subject according to various embodiments of the present invention. The electronic device according to an embodiment of the present invention (e.g., the 3-D space determining module 170) may determine, as a 3-D space related to a subject, a 3-D space including the subject, re-configured by using images of the subject obtained from a camera, and the surroundings of the subject.

Referring to FIG. 2, a subject may be a table 220, a flower vase 210 on the table 220, etc. The boundary box 230 may be a virtual boundary space of a certain volume containing the subject 210 or 220. According to an embodiment, the boundary box 230 may be set to determine a range of operations in order to define a 3-D space. When the electronic device performs operations for a 3D-space based on the boundary box 230, it may omit operations for a space outside the boundary box 230. For example, when the boundary box 230 is set to be small in volume, the volume of the 3-D space determined depending on the boundary box 230 is also set to be small; however, the amount of operations required to define the 3-D space may be reduced. According to various embodiments, the electronic device may create a depth map (not shown) corresponding to information about a depth from the camera to the surface of the subject 210 or 220 (e.g., a distance between the camera and the surface of the subject 210 or 220) by using taken images related to the subject 210 or 220, and may re-configure a 3-D model 250 related to the subject 210 or 220, based on the created depth map.

A 3-D model 250 according to various embodiments of the present invention may be a set of voxels 255. A voxel 255 may be a cube as a basic unit in 3-D space. By using, for example, depth information included in a created depth map, the electronic device may re-configure the 3-D model 250 related to the subject 210 or 220 with voxels 255 that are determined as they are located on the surface of the subject 210 or 220 or inside the subject 210 or 220 within a space in the vicinity of the subject 210 or 220, e.g., a space inside the boundary box 230.

An altitude map 260 according to various embodiments may include the continuity information and the location in the direction of altitude of the 3-D model 250 with respect to a particular plane. According to an embodiment, the altitude map 260 may be a set of pixel planes 265. A pixel plane 265 may be a rectangle as basic unit in two dimensional (2-D) plane. For example, each of the pixel planes 265 configuring the altitude map 260 may include the continuity information and the location in the direction of altitude of the 3-D model 250, corresponding to the area of the pixel plane 265.

At least one of the configuration elements shown in FIG. 2, e.g., subject 210 or 220, boundary box 230, 3-D model 250, and altitude map 260, may be expressed or stored in the form of data, data structure, matrix, etc., corresponding to the cubic or planar characteristics descried above, during the process.

The configuration elements shown in FIG. 2 will be used in the following description to explain various embodiments. It should be understood that the elements are used as concepts to include various embodiments described in the foregoing or following description.

Figure 3:
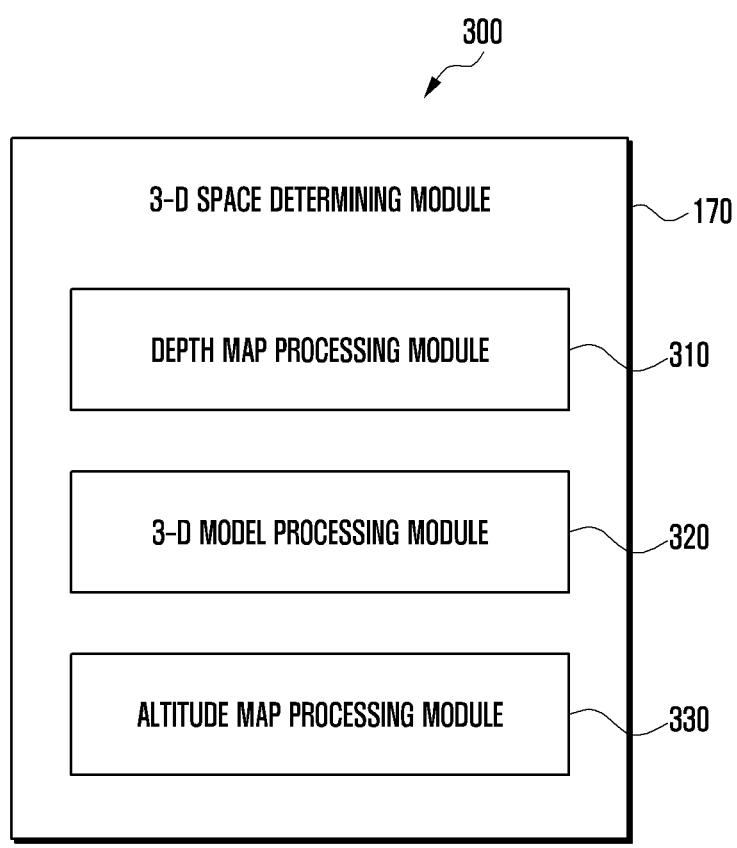
FIG. 3 illustrates a schematic block diagram of a three-dimensional space determining module of an electronic device according to various embodiments of the present invention.

FIG. 3 illustrates a schematic block diagram of a three-dimensional (3-D) space determining module 170 of an electronic device (e.g., electronic device 101) according to various embodiments of the present invention. Referring to FIG. 3, the 3-D space determining module 170 may include a depth map processing module 310, 3-D model processing module 320 and altitude map processing module 330.

According to various embodiments, the depth map processing module 310 may identify a distance or depth from the camera to a subject, by using, for example, an image of the subject obtained through the camera and the information about the position or focus of the camera. The depth map processing module 310 may create a depth map related to the subject based on the identified depth. The depth map may be used to re-configure an image or 3-D information related to the subject in the image.

According to various embodiments, the depth map processing module 310 may use a plurality of images of a subject, obtained through a mono-scope camera, and information about the locations and focuses of the camera when it took the corresponding images in order to create a depth map.

According to various embodiments, the depth map processing module 310 may create a depth map including information about a depth of a subject (e.g., a distance from a camera to the surface of a subject) by using images taken from the subject by the camera and the positions and focuses of the camera when it took the corresponding images. Images and information about the positions and focuses of the camera when it took the corresponding images may be continuously obtained. As the relative position of a camera varies with respect to a subject while it is taking images of the subject (e.g., the user holds and places the camera of the mobile device to the subject, changing the angle or positions or the camera takes images that are slightly different from each other due to the camera shake caused by the user's hand unstable), various images may be obtained at the corresponding angles and focuses.

According to an embodiment, the depth map processing module 310 may create a depth map including depth information, from images obtained by using, for example, a plane-sweep approach. The plane-sweep approach will be described in detail later referring to FIG. 4.

According to various embodiments, the 3-D model processing module 320 may re-configure a 3-D model for at least part of space of a subject by using, for example, depth information created by the depth map processing module 310. The 3-D model processing module 320 may identify a space corresponding to the surface and inside of a subject in the 3-D space, based on, for example, depth information included in a depth map. The 3-D model processing module 320 may create a 3-D model of a subject based on the identified space.

According to various embodiments, in order to re-configure a 3-D model (e.g., 3-D model 250) of a subject (e.g., a flower vase 210 or a table 220) for at least part of space of the subject, the 3-D model processing module 320 may set a boundary box (e.g., boundary box 230) based on the subject. The 3-D model processing module 320 may set, for example, a cube including a subject at the center as the boundary box of a 3-D space of a subject. The 3-D model processing module 320 may configure a 3-D model of a subject by processing only information about corresponding depths within a range of the boundary box, instead of reconfiguring information about all depths shown on the depth map in 3-dimension.

According to various embodiments, the 3-D model processing module 320 may be implemented with a function, e.g., u: X→R where X is a set of voxels for the inside of a 3-D space (e.g., the boundary box 230) of a particular range. For example, a function u(x) may map the voxels located inside a subject to a negative value (e.g., u(x)<0). A function u(x) may map the voxels located outside a subject to a positive value (e.g., u(x)<0). A function u(x) may map the voxels located on the surface of a subject, to zero, i.e., u(x)=0.

According to various embodiments, the 3-D model processing module 320 may determine a domain plane to re-configure a 3-D model (e.g., 3-D model 250) for at least part of space of a subject. For example, the domain plane may be the lowest plane of a boundary box (e.g., the boundary box 230).

According to various embodiments, in order to re-configure a 3-D model (e.g., 3-D model 250) of a subject for at least part of space of the subject, the 3-D model processing module 320 may divide at least part of space of the subject into voxels (e.g., voxels 255). A voxel may be a cube as a basic unit in 3-D space. A pixel plane as a basic unit may be used to understand a plane. For example, a voxel may be a cube with parallel edges with respect to spatial axes (e.g., x-axis, y-axis, z-axis, etc.), axes created by the vector summation of spatial axes or a combination thereof. The size of voxel may vary according to settings. For example, a voxel may be a unit cube the edges of which are one in length in the x-, y- and z-axes, respectively.

According to various embodiments, the 3-D model processing module 320 may discretize the depth map so that the discretized results correspond to voxels (e.g., voxels 255) respectively. The 3-D model processing module 320 may obtain a 3-D model (e.g., 3-D model 250) to obtain altitude information, through the discretization process. The 3-D model processing module 320 may detect a depth of the surface of a subject from, for example, the depth map. The 3-D model processing module 320 assumes a voxel, through which the extension line connecting a corresponding point on a 3-D space by the depth map to the opposite side passes, as a space occupied by a subject, and may obtain the 3-D model as a set of voxels 255. The 3-D model processing module 320 may obtain a 3-D model in a soft form when the voxel is set to be small in size and a 3-D model in a rough form when the voxel is set to be large in size. According to an embodiment, the size of voxel may affect the process of an altitude map performed in the altitude map processing module 330 which will be described later. For example, the size of a pixel plane (e.g., pixel plane 265) of an altitude map may be set in proportion to that of a voxel. The method of configuring a 3-D model by mapping depth information to voxels will be described in detail later referring to FIG. 5.

According to various embodiments, the 3-D model processing module 320 may control the size of voxel (e.g., voxel 255) in a variety of levels, in order to create valid information and to enhance the process speed, in relation to an altitude map created in the altitude map processing module 330. The 3-D model processing module 320 may set the length of edges of a voxel through, for example, a method of controlling the size of voxel. For example, in order to quickly process information about an altitude, a voxel may be set to a cube one edge of which is one unit in the x-axis direction, another edge of which is one unit in the y-axis direction, and the other edge of which is three units in the z-axis direction. According to an embodiment, the larger the volume of a voxel the faster the process speed of the altitude map processing module 330.

According to various embodiments, the 3-D model processing module 320 may monitor the process speed of operations related to the determination of a 3-D space and may control the size of voxel (e.g., voxel 255) according to the process speed. For example, when a corresponding operation is processed within a relatively short period of time, the 3-D model processing module 320 may conclude that the process speed is fast. The components monitored by 3-D model processing module 320 may be a speed of creating a 3-D model, a speed of creating an altitude map, etc. The 3-D model processing module 320 may compare a period of time required to process the monitored component with a threshold (e.g., to determine whether a period of time required to process the monitored component is greater than a threshold), and may control the size of voxel according to the comparison result. For example, when the information process (e.g., 3-D model creation or altitude map creation) of an object moving in images needs to be performed less than at least 500 ms in order to guarantee the stable reaction speed of the object, the 3-D model processing module 320 may monitor the process speed and may increase the size of voxel when it takes greater than or equal to 500 ms.

According to an embodiment, the size of voxel may be adaptively controlled in the process of creating a 3-D model. For example, the 3-D model processing module 320 many monitor the execution period of time for creating a 3-D model and may control the size of voxel when a period of time required to complete the 3-D model creation exceeds a threshold. For example, the size of voxel may be increased in the altitude axis (e.g., z-axis).

Figure 6:
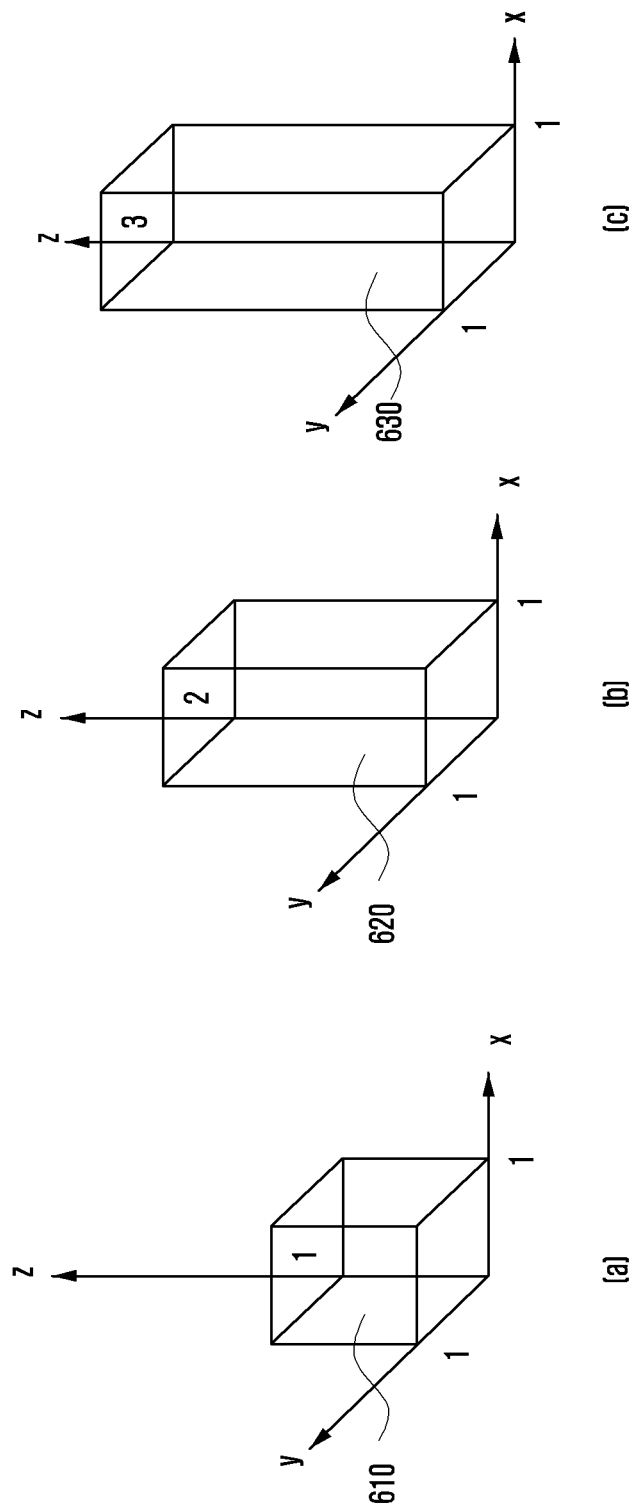
FIGS. 6A to 6C are coordinate systems that describe a method of controlling the size of voxel in an electronic device according to various embodiments of the present invention.

Controlling the size of voxel may be performed before, after or during the creation of a 3-D model. The setting of the size of voxel, as to the result of controlling the size of voxel, may be reflected to the 3-D model processing module 320. The method of controlling the size of voxel based on the process speed will be described in detail later referring to FIG. 6.

According to various embodiments, the altitude map processing module 330 may obtain altitude information related to a subject, based on the 3-D model information obtained from the 3-D model processing module.

According to various embodiments, the altitude map processing module 330 may create an altitude map (e.g., altitude map 260) including altitude information related to a subject. For example, the altitude map may be configured in such a way as to determine a domain plane (e.g., the lowest plane of a boundary box, a plane the altitude of which is constant over a relatively large range, etc.) and to map altitude information on the determined domain plane. The altitude map processing module 330 may divide a domain plane into pixel planes to match altitude information to the domain plane. According to an embodiment, a pixel plane may be set to a unit of one pixel. A pixel plane may also be set to a unit of a pixel patch (e.g., a unit of a range corresponding to an area of the bottom side of a voxel), where the pixel patch includes a plurality of pixels in the width or length direction.

According to various embodiments, the altitude map processing module 330 may create an altitude map (e.g., an altitude map 260) related to a subject within a range of the boundary box (e.g., boundary box 230). The altitude map processing module 330 may determine a domain plane of an altitude map as a plane parallel to the bottom side of the inside of the boundary box. The domain plane of an altitude map may be, for example, the lowest bottom side of the boundary box. The altitude map processing module 330 may determine the segment and length of a domain plane in the x-axis to correspond to the number of voxels (e.g., voxels 255), along the x-axis of the boundary box, with respect to the domain plane. Similarly, the altitude map processing module 330 may also determine the segment and length of a domain plane in the y-axis to correspond to the number of voxels, along the y-axis of the boundary box. The altitude map processing module 330 may divide the determined domain plane of an altitude map into pixel planes (e.g., pixel planes 265) according to segments. According to an embodiment, the altitude map may include spatial information occupied by a 3-D model (e.g., 3-D model 250) of a subject along the altitude axis with respect to a pixel plane of a domain plane. For example, the altitude map may include information about the continuity and position occupied by a 3-D model of a subject. This information may be configured to be mapped to respective pixel planes of a domain plane. The method of mapping information about the continuity and position occupied by a 3-D model to an altitude map will be described in detail later referring to FIG. 7.

According to various embodiments, the altitude map processing module 330 may remove noise from an altitude map. The altitude map may include altitude information of low validity that may be generated in respective processes of creating an altitude map from images. The electronic device may determine the validity of information about a specific altitude by using information about other altitudes adjacent to the specific altitude in the altitude map. For example, when the electronic device compares information about a specific altitude with information about other altitudes adjacent to the specific altitude and ascertains that the continuity is relatively low, it may conclude that the information about the specific altitude is low in validity. When the altitude map processing module 330 identifies altitude information with a relatively low validity, it may remove the information from the altitude map.

According to an embodiment, noise may be removed from an altitude map in such a way that a min-max dilation and a min-max erosion are successively applied to the altitude map. For example, when an altitude map is expressed in gray scale, the min-max dilation for an altitude map image may be performed according to the following Equation 1.

$$I(x, y) = \max_{x', y' \in N(x,y)} I(x', y') \qquad \text{[Equation 1]}$$

In Equation 1, I(x,y) may denote the degree of cohesion of an image corresponding to a pixel plane (x, y). N(x,y) may denote an image patch (e.g., a set of pixels) at the center in a pixel plane (x,y). Similarly, the min-max erosion may be performed according to the following Equation 2.

$$I(x, y) = \min_{x', y' \in N(x,y)} I(x', y') \qquad \text{[Equation 2]}$$

Although the embodiment of the present invention employs the min-max dilation or the min-max erosion to remove noise from an altitude map, it should be understood that the present invention is not limited thereto. It should be understood that the present invention may also use other methods or algorithms to remove noise.

Figure 4:
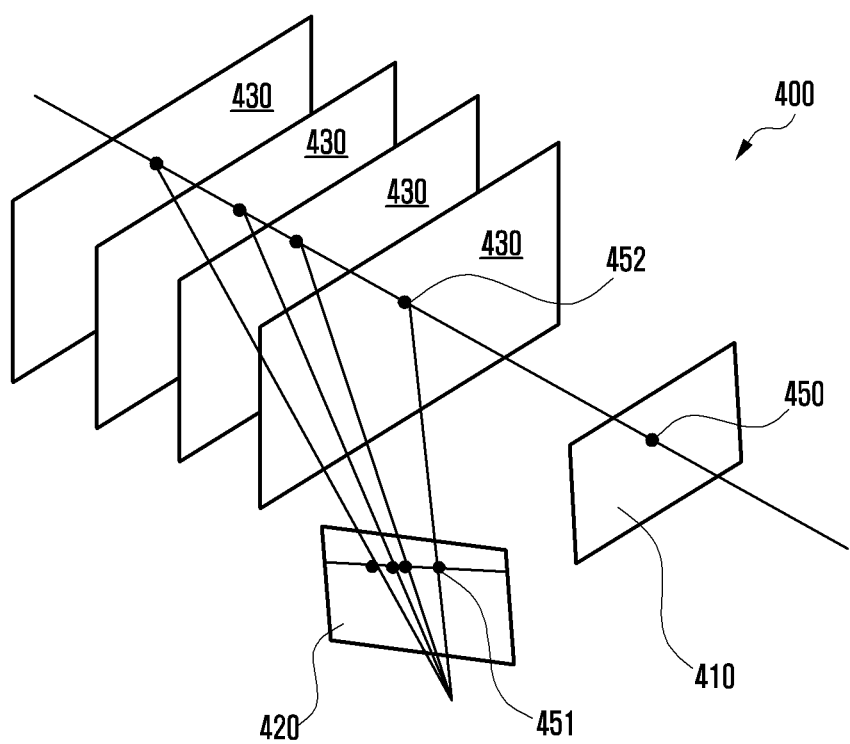
FIG. 4 illustrates a diagram that describes a plane-sweep approach used in an electronic device according to various embodiments of the present invention.

FIG. 4 illustrates a diagram that describes a plane-sweep approach 400 used in an electronic device according to various embodiments of the present invention.

Referring to FIG. 4, the electronic device (e.g., the depth map processing module 210) may obtain a depth map by using a plane-sweep approach. In the embodiment, a view may be an image including information about a focus or position of a camera. The electronic device may determine a specific view of a plurality of obtained views as a key view 410. The electronic device may determine the other views except the key view 410 as reference views 420. The electronic device may arrange planes 430, crossing the 3-D space, iteratively, at a preset interval, parallel to the key view 410. Planes 430 located at a specific depth from the key view 410 may be formed so that homographies are projected or mapped from all the reference views 420 to each of the planes 430. As the depth between the key view 410 and the plane 430 varies, the homography between the key view 410 and the reference view 420 may also vary. Therefore, the image of the reference view 420 mapped to the parallel planes 430 may vary according to the depths between the key view 410 and the planes 430. For example, when a plane 430 with a specific depth under the same brightness condition precisely passes on the surface of a subject, the color of a key view image projected from a key view 410 and the color of a reference view image (e.g., a particular pixel 451 of a reference view) projected from a reference view 420 may be consistent with each other, above a plane 430 with a corresponding depth.

For example, the electronic device may identify the similarity between two images, crossing the 3-D space with these planes 430, and may determine 3-D depth values for respective areas of a key view image corresponding to the surface of a subject. The electronic device may compare, for example, the color of a particular pixel (e.g., pixel 450) of a key view image mapped to the respective planes 430 crossing the 3-D space with the color of a particular pixel (e.g., pixel 451) of a reference view image, and may allocate the depth value of a plane with the most similar color to the particular pixel (e.g., pixel 450) of a key view. For example, when the pixels 450 and 451 of the key view and the reference view with respect to the point 452 on a plane closest to the key view are most similar in color to each, the electronic device may allocate the depth value of the point 452 to the pixel 450.

According to an embodiment, in order to perform a process to be less sensitive with respect to, for example, noise or distortion, the electronic device may compare two images in color, based on a patch unit of a plurality of pixels in the width or length (e.g., 3×3, 5×5, 2×5, etc.), instead of a single pixel.

Figure 5:
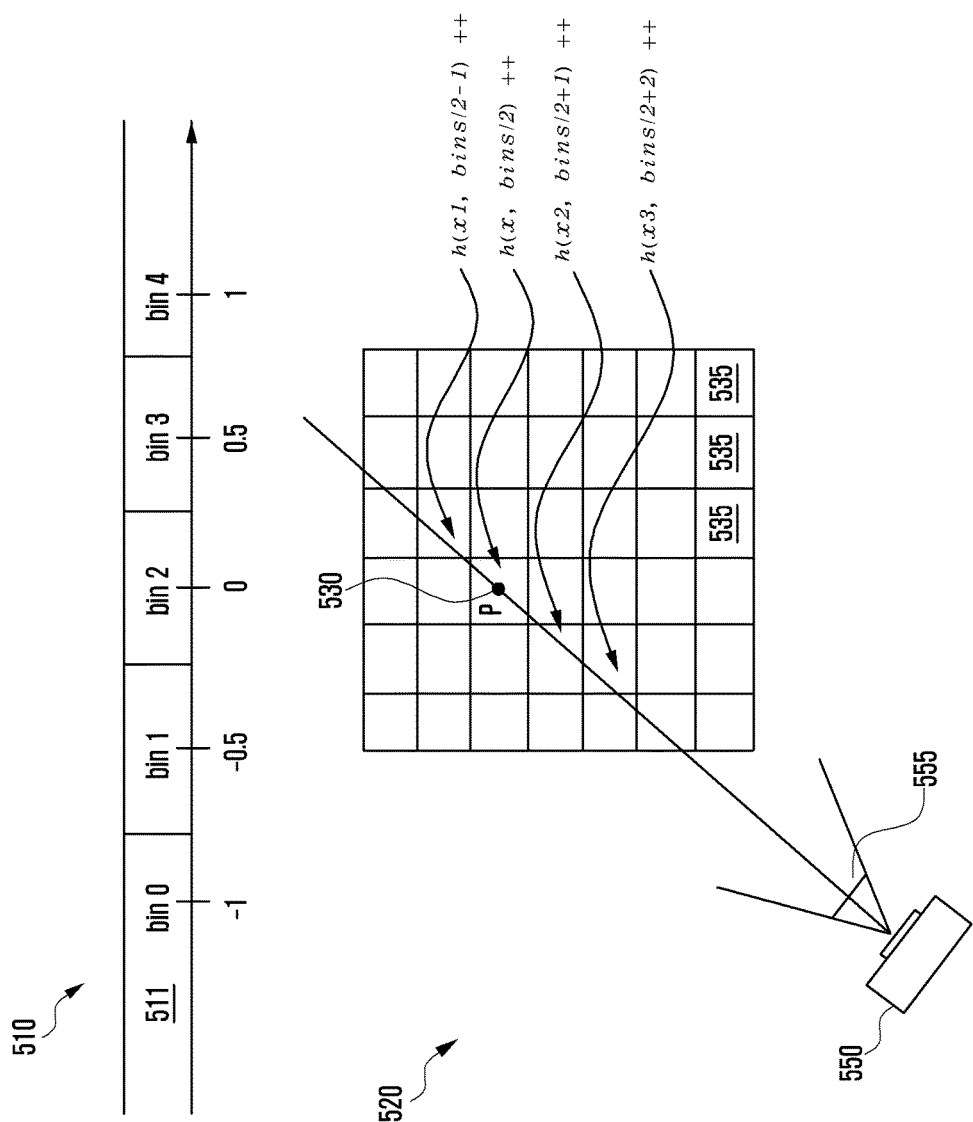
FIG. 5 illustrates a diagram that describes a method of re-configuring a three-dimensional model using a histogram in an electronic device according to various embodiments of the present invention.

FIG. 5 illustrates a diagram that describes a method of re-configuring a three-dimensional (3-D) model using a histogram in an electronic device according to various embodiments of the present invention. Referring to FIG. 5, the electronic device (e.g., 3-D model processing unit 320) may convert a depth map to a form of histogram 510 in order to re-configure a function u for 3-D modeling, for example. According to an embodiment, the histogram 510 may be expressed as another function, h: X×{0}∪N→{0}∪N. The histogram 510 may be divided into segments of a fixed number (e.g., five segments). The value of function u corresponding to each segment 510 may correspond to histogram bin 511 (e.g., bin0, bin1, bin2, bin3, and bin4). A histogram value corresponding to a particular voxel x and a particular histogram bin i may be expressed as h(x, i). When an accumulated value of a histogram bin 511 is relatively large, the function u has a relative large probability that it is likely to be within a range of value of a segment corresponding to the bin in a corresponding voxel. For example, in a particular voxel, bin0 may correspond to a value [ ] of a function u and bin1 may correspond to a value [ ] of a function u. When a value of 3 is allocated to bin0 and two to bin2, the probability that the value of function u in a corresponding voxel is within a range of [ ] may be high.

The electronic device (e.g., the 3-D model processing unit 320) may obtain the function u, by processing the histogram 510, shown in FIG. 5, by using, for example, depth map of a depth map. The electronic device may calculate the point 530 for a depth corresponding to each of the pixels of a depth map, in relation to the function u. A voxel x including the point 530 may be discovered. The value of the center bin in a histogram corresponding to a voxel x (e.g., the bin numbered by the center number from among a plurality of bins in the histogram; a bin numbered by |bins/2| where the 'bins' denotes the total number of bins and the bins are numbered from 0 to the end; or a bin when the value of the function u is zero) may be increased. As shown in FIG. 5, a virtual line extends from the center of the camera 550 and passes through the point P 530. For voxels (e.g., x1) through which the virtual line from the point P530 passes in the direction away from the camera 550, as the line travels far away from the camera 550 by one unit, the corresponding voxel 535 is located farther from the camera 550 and a bin's number is decreased with respect to the center bin, so that the value corresponding to a corresponding bin's number can be increased (e.g., h(x1, bins/2−1)++). Similarly, for voxels 535 (e.g., x2 and x3) through which the virtual line from the point P530 passes in the direction close to the camera 550, as the line travels close to the camera 550 by one unit, the corresponding voxel 535 is located closer to the camera 550 and a bin's number is increased with respect to the center bin, so that the value corresponding to a corresponding bin's number can be increased (e.g., h(x2, bins/2+1)++, h(x3, bins/2+2)++).

The electronic device may derive the function u for 3-D modeling by obtaining a solution of the following optimization problem, expressed by the following Equation 3, by using, for example, the histogram 510 described above.

$$u(x) = \min_{u}\left(\int_{\Omega}|\nabla u| + \lambda \sum_{i=1}^{bins}\int_{\Omega}h(x, i)|u(x) - d_i|dx\right) \quad \text{[Equation 3]}$$

In Equation 3, λ denotes a weight, and Ω denotes a boundary box in the vicinity of a subject. According to an embodiment, a first order primal-dual algorithm may be used to obtain a solution of the optimization problem.

FIGS. 6A to 6C are coordinate systems that describe a method of controlling the size of voxel in an electronic device according to various embodiments of the present invention. Referring to FIGS. 6A to 6C, each of the voxels 610 to 630 may be a cube as a basic unit in 3-D space. A pixel plane as a basic unit may be used to understand a plane. For example, a voxel 355 may be a cube with parallel edges with respect to spatial axes (e.g., x-axis, y-axis, z-axis, etc.), axes created by the vector summation of spatial axes or a combination thereof. In general, the z-axis may be referred to as the altitude axis. The size of voxel may vary according to settings.

According to an embodiment, as shown in FIG. 6A, a first voxel 610 may be set to a cube one edge of which is one unit in the x-axis direction, another edge of which is one unit in the y-axis direction, and the other edge of which is one unit in the z-axis direction.

According to an embodiment, as shown in FIG. 6B, a second voxel 620 may be set to a cube one edge of which is one unit in the x-axis direction, another edge of which is one unit in the y-axis direction, and the other edge of which is two units in the z-axis direction.

According to an embodiment, as shown in FIG. 6C, a third voxel 630 may be set to a cube one edge of which is one unit in the x-axis direction, another edge of which is one unit in the y-axis direction, and the other edge of which is three units in the z-axis direction. According to various embodiments, the electronic device (e.g., 3-D model processing unit 320) may selectively control the size of voxel in order to create valid information and to enhance the process speed. According to an embodiment, the electronic device may set the edges of a voxel to different lengths according to axes in order to control the size of voxel. In order to validly and quickly process information about an altitude, the electronic device may set a voxel in such a way that one edge parallel to one axis (e.g., the z-axis) is greater than the other edges parallel to the other two axes (e.g., x- and y-axes). For example, when the size of voxel is set not to the first voxel 610 but to the second voxel 620 or the third voxel 630, the electronic device may enhance the speed of processing altitude information.

According to various embodiments, the size of voxel may be controlled based on the speed of processing operations related to the 3-D space determination (e.g., the 3-D model creation speed). For example, when the size of an initial voxel is set in such a way as the second voxel 620, the electronic device may monitor the period of time to execute a series of operations for 3-D modeling and may set the size of voxel based on the execution period of time. When the period of time required to complete the execution is greater than a threshold t1 (e.g., the execution speed is less than the minimally requested value), the size of voxel may increase in the direction of altitude-axis (i.e., z-axis) (e.g., the size of voxel may be set in size to the third voxel 630). When the period of time required to complete the execution is less than a threshold t2 (e.g., the execution speed is greater than the optimally requested value), the size of voxel may decrease in the direction of altitude-axis (e.g., the size of voxel may be set in such a way as the first voxel 610).

Figure 7:
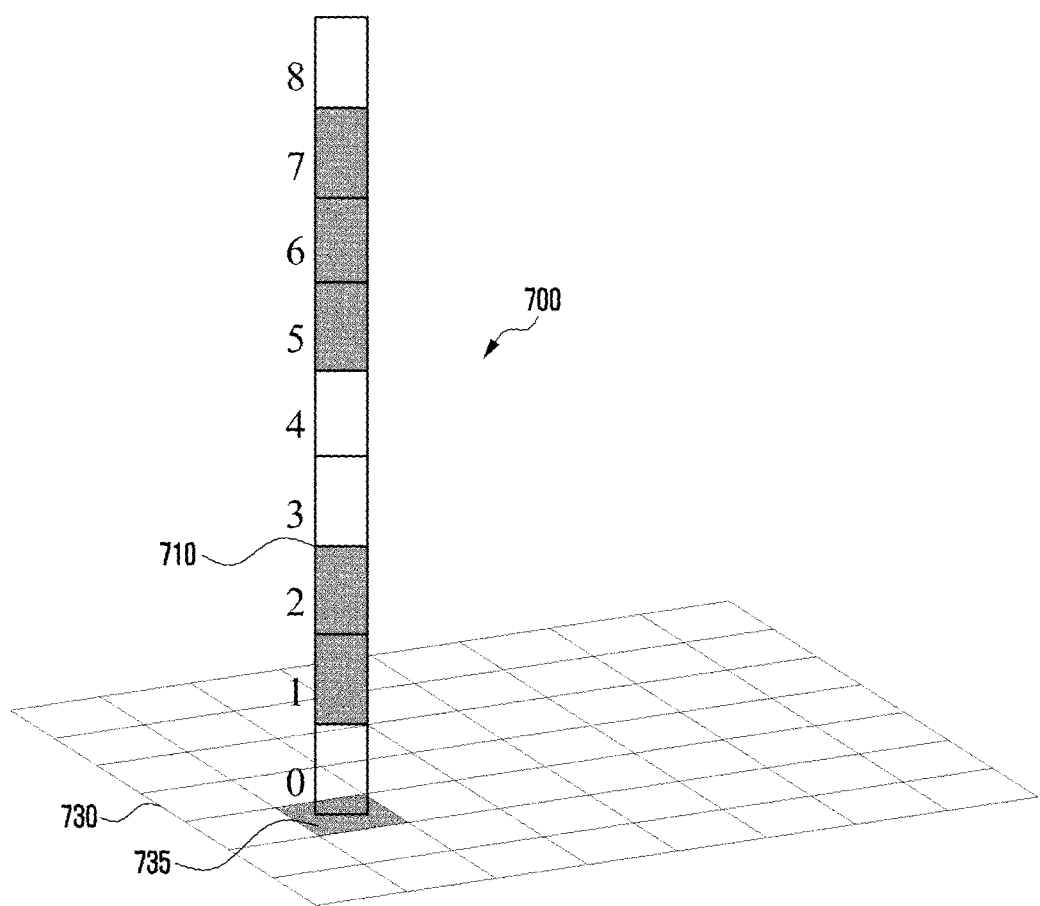
FIG. 7 illustrates a diagram that describes a method of obtaining an altitude map in an electronic device according to various embodiments of the present invention.

FIG. 7 illustrates a diagram that describes a method of obtaining an altitude map in an electronic device according to various embodiments of the present invention.

According to various embodiments, the electronic device (e.g., the altitude map processing module 230) may extract space information of a 3-D model of a subject through a function u. For example, pixel planes 735 of an altitude map 730 may include a 3-D model matrix 710 corresponding to the pixel planes 735. The electronic device may map, to a 3-D model matrix 710, space information of a 3-D model based on a space of a 3-D mode (e.g., a voxel, as a set of voxels satisfying u(x)<0, determined as it passes through the inside of a subject or travels on the surface of a subject) based on the function u. For example, the electronic device may map voxels of a 3-D model to part of a 3-D model matrix 710, highlighted in color, (e.g., rows (1 and 2) and rows (5, 6 and 7)).

According to various embodiments, the electronic device may identify the continuity shown in a 3-D model matrix 710 corresponding to each of the pixel planes 735 of an altitude map 730, and may identify parts of the 3-D model matrix 710 which are successive and equal to or greater than a specific length (e.g., two or more successive rows, such as rows (1 and 2) and rows (5, 6, and 7), or the longest successive rows (5, 6, and 7), etc.) as information the validity of which is relatively high. When the electronic device identifies parts of the information which have a relatively low validity, it may remove the parts from the altitude map 730.

According to various embodiments, the electronic device may identify the continuity shown in a 3-D model matrix corresponding to each of the pixel planes of an altitude map 730, and may identify parts of the 3-D model matrix, which are successive and equal to or greater than a specific length and have a row of the highest altitude, as information the validity of which is relatively high. When the electronic device identifies parts of the information which have a relatively low validity, it may remove the parts from the altitude map 730. For example, from parts of the 3-D model matrix 710 that have two or more successive rows (1, 2) and (5, 6, and 7), the electronic device may select the part of the successive rows which has the highest altitude 7, i.e., (5, 6, 7), as part corresponding to information with a relatively high validity.

Figure 8:
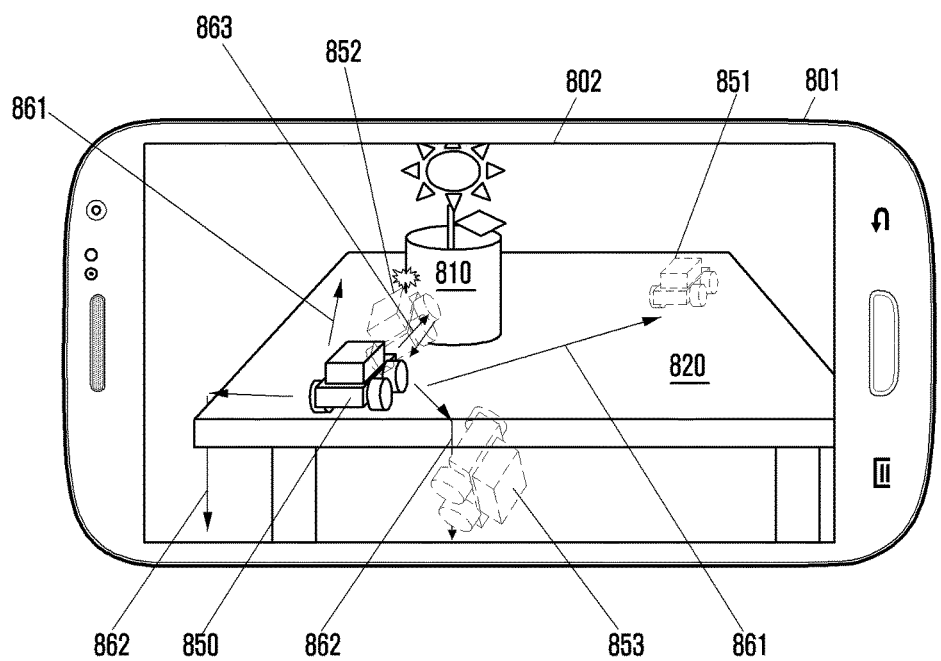
FIG. 8 illustrates a screen of an electronic device displaying objects in three-dimension, according to various embodiments of the present invention.

FIG. 8 shows a screen of an electronic device displaying objects in three-dimension, according to various embodiments of the present invention. The electronic device 801 (e.g., the electronic device 101 shown in FIG. 1) according to various embodiments may display an object on a display 802 (e.g., the display 150 shown in FIG. 1) based on at least part of a space so that the object can move or react above at least part of an image as if it is in a 3-D space.

For example, a subject may include a table 820 and a flower vase 810 placed on the table 820. The electronic device 801 may display an image of a subject, including the table 820 and the flower vase 810, obtained through a camera module, on the display 802. The electronic device 801 may detect the subject, including the table 820 and the flower vase 810 placed on the table 820, and the surrounding space in three dimensions.

According to various embodiments, the electronic device may display an object 850 within the perceived 3-D space. According to an embodiment, the object 850 may be displayed on the screen with a visual effect 861 that is as if it moves on the table 820 in the real world. According to an embodiment, the object 850 may be displayed on the screen with a visual effect 853, showing that the closer the object moves to the electronic device the larger the object is displayed, or with a visual effect 851, showing that the farther the object moves from the electronic device the smaller the object is displayed. According to an embodiment, the object 850 may be displayed on the screen with a visual effect 852 (e.g., a titling effect, a colliding effect, etc.) showing that it is running into a particular region of the flower vase 810 as an obstacle, or with a visual effect 863 showing that it is rebounding from the flower vase 810 after the collision. According to an embodiment, the object 850 may be displayed on the screen with a visual effect 862 showing that it falls down to a particular region as a hollow place from the edge of the table.

According to various embodiments, an electronic device includes: a camera module for obtaining images of a subject; a display module; and a three-dimensional (3-D) space determining module for: obtaining three-dimension (3-D) model information about at least part of a space of the subject included in an image taken by the camera module; obtaining altitude information about the at least part of a space based on the 3-D model information; identifying at least one characteristic area located at the at least part of a space based on variation of the altitude information; and displaying a visual effect related to movement of an object on the display module, based on the 3-D model information and the characteristic area.

According to various embodiments, the 3-D space determining module performs one of the following: identifying the characteristic area as an obstacle when the altitude is rapidly increased compared with the adjacent space; identifying the characteristic area as an uphill when the altitude is gradually increased compared with the adjacent space; identifying the characteristic area as a pit when the altitude is rapidly decreased compared with the adjacent space; and identifying the characteristic area as a downhill when the altitude is gradually decreased compared with the adjacent space.

According to various embodiments, the 3-D space determining module may include: a depth map processing module for creating a depth map including information about a depth from the camera module to the surface of the subject, by using the image; and a 3-D model processing unit for transforming the at least part of a space to a 3-D model of a set of voxels, by using the depth information.

According to various embodiments, the 3-D space determining module may further include: an altitude map processing module for transforming the altitude information/the at least part of a space to an altitude map including information about a height on the plane of the 3-D model based on the 3-D model.

According to various embodiments, the 3-D space determining module: may set the size of voxel; may divide the at least part of a space into voxels based on the set size of voxel; and may perform discretization by mapping the depth map to the respective voxels of the at least part of a space.

According to various embodiments, the 3-D space determining module: may monitor a process speed of obtainment of the 3-D model information and/or a process speed of obtainment of the altitude information; and may control the size of voxel based on the process speed.

According to various embodiments, the 3-D space determining module may adjust a length of the voxel, parallel to the altitude axis to control the size of voxel.

According to various embodiments, the 3-D space determining module may set: when the process speed is less than a threshold, the voxel in such a way that one edge parallel to the altitude axis (z-axis) is greater than the other edges parallel to the other two axes (x- and y-axes); or when the process speed is more than the threshold, the voxel in such a way that one edge parallel to the altitude axis (z-axis) is shorter than the other edges parallel to the other two axes (x- and/or y-axes).

According to various embodiments, the altitude map processing module may determine a domain plane; and may configure, for at least part of the pixel planes in the domain plane, at least one of the following: continuity and position occupied by a 3-D model of the subject in the pixel plane, along the altitude axis.

Figure 9:
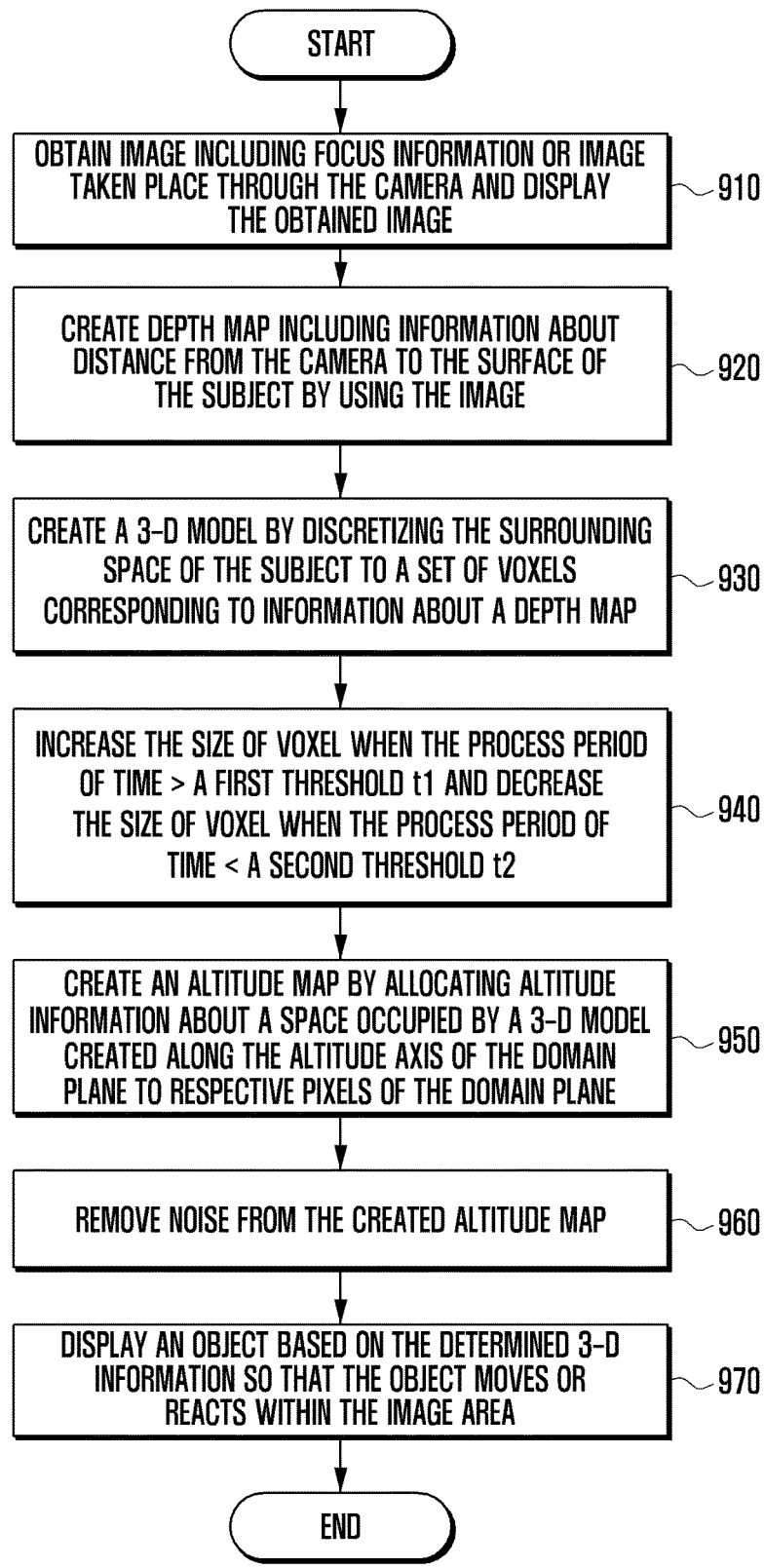
FIG. 9 is a flow chart that describes a control method of an electronic device according to various embodiments of the present invention.

According to various embodiments, the altitude map processing module: may identify the validity of the altitude information by using the continuity information of the altitude map; and may remove at least part of the altitude information, based on the validity. FIG. 9 is a flow chart that describes a control method of an electronic device according to various embodiments of the present invention.

The electronic device may obtain an image of a subject through the camera and may display the obtained image on the display (910). The obtained image may include information about the focus of the camera or the location (place) where the image is taken by the camera. The obtainment and display of an image may be performed in real time. The electronic device may store the obtained image on the memory and may use the image to determine a 3-D space. The electronic device may obtain information about a distance (or depth) from the camera to the surface of the subject by using the obtained image (920). The electronic device may create a depth map including depth information based on the obtained depth information. The electronic device may create a 3-D model by discretizing the surrounding space of the subject to voxels corresponding to information about a depth map (930). The electronic device may set a boundary box and may create a 3-D model with voxels inside the boundary box, corresponding to information about a depth map. The electronic device may create a 3-D model by using a voxel set in such a way that one edge in the altitude axis is greater than the other edges in the other two axes.

The electronic device may monitor the process period of time and may control the size of voxel based on the process period of time (940). According to an embodiment, the electronic device may increase the size of voxel when the process period of time is greater than a first threshold t1 and may decrease the size of voxel when the process period of time is less than a second threshold t2. Operation 940 may be performed before or after any other operation in the flow chart or may be removed from the flow chart.

The electronic device may create an altitude map by allocating altitude information about a space occupied by a 3-D model created along the altitude axis of the domain plane to respective pixels of the domain plane (950).

The electronic device may remove noise from the created altitude map (960). For example, the electronic device may remove noise from an altitude map in such a way that a min-max dilation and a min-max erosion are successively applied to the altitude map. Operation 950 may be performed before or after any other operation in the flow chart or may be removed from the flow chart.

The electronic device may display an object based on the determined 3-D information so that the object moves or reacts within the image area (970). For example, the electronic device may display an object based on altitude information about an altitude map so that the object moves or reacts within the image area.

According to various embodiments, a method of processing three-dimensional (3-D) information in an electronic device includes: obtaining 3-D model information about at least part of a space of a subject included in an image taken by a camera functionally connected to the electronic device; obtaining altitude information about the at least part of a space based on the 3-D model information; identifying at least one characteristic area located at the at least part of a space based on variation of the altitude information; and displaying a visual effect related to movement of an object on a display functionally connected to the electronic device, based on the 3-D model information and the characteristic area.

According to various embodiments, the process of identifying at least one characteristic area includes one of the following: identifying the characteristic area as an obstacle when the altitude is rapidly increased compared with the adjacent space; identifying the characteristic area as an uphill when the altitude is gradually increased compared with the adjacent space; identifying the characteristic area as a pit when the altitude is rapidly decreased compared with the adjacent space; and identifying the characteristic area as a downhill when the altitude is gradually decreased compared with the adjacent space.

According to various embodiments, the process of obtaining 3-D model information includes: creating a depth map including information about a depth from the camera to the surface of the subject, by using the image; and transforming the at least part of a space to a 3-D model of a set of voxels, by using the depth information.

According to various embodiments, the process of obtaining altitude information includes: transforming the altitude information/the at least part of a space to an altitude map including information about a height on the plane of the 3-D model based on the 3-D model.

According to various embodiments, the process of transforming the at least part of a space to a 3-D model includes: setting the size of voxel; dividing the at least part of a space into voxels based on the set size of voxel; and performing discretization by mapping the depth map to the respective voxels of the at least part of a space.

According to various embodiments, the process of setting the size of voxel includes: monitoring a process speed of obtainment of the 3-D model information and/or a process speed of obtainment of the altitude information; and controlling the size of voxel based on the process speed.

According to various embodiments, the process of controlling the size of voxel includes: adjusting a length of the voxel, parallel to the altitude axis (z-axis).

According to various embodiments, the process of controlling the size of voxel includes at least one of the following: setting, when the process speed is less than a threshold, the voxel in such a way that one edge parallel to the altitude axis (z-axis) is greater than the other edges parallel to the other two axes (x- and y-axes); and setting, when the process speed is more than the threshold, the voxel in such a way that one edge parallel to the altitude axis (z-axis) is shorter than the other edges parallel to the other two axes (x- and/or y-axes).

According to various embodiments, the transformation to an altitude map includes: determining a domain plane; and for at least part of the pixel planes in the domain plane, configuring at least one of the following: continuity and position occupied by a 3-D model of the subject in the pixel plane, along the altitude axis.

According to various embodiments, the process of obtaining altitude information includes: identifying the validity of the altitude information by using the continuity information of the altitude map; and removing at least part of the altitude information, based on the validity.

Figure 10:
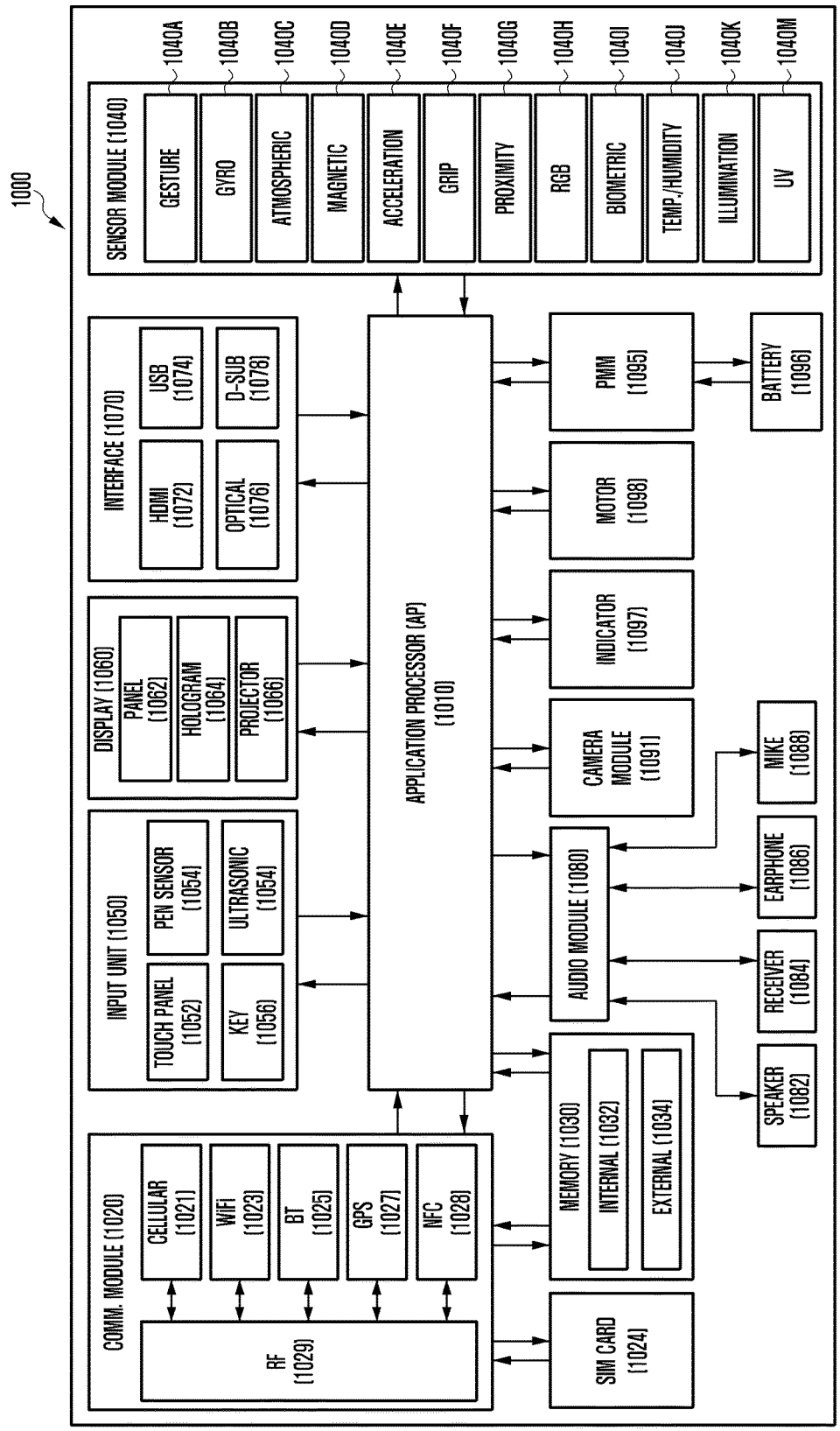
FIG. 10 illustrates a schematic block diagram of an electronic device according to various embodiments of the present invention.

FIG. 10 illustrates a block diagram of an electronic device according to various embodiments. The electronic device 1000, for example, may constitute all or a part of the electronic device 101 shown in FIG. 1.

Referring to FIG. 10, the electronic device 1000 may include at least one application processor (AP) 1010, a communication module 1020, at least one subscriber identity module (SIM) card 1024, a memory 1030, a sensor module 1040, an input module 1050, a display 1060, an interface 1070, an audio module 1080, a camera module 1091, a power management module 1095, a battery 1096, an indicator 1097, and a motor 1098.

The AP 1010 may drive an operating system or an application program to control a plurality of hardware or software components connected to the AP 1010, and may perform processing and operations of various data including multimedia data. The AP 1010, for example, may be implemented as a system on chip (SoC). According to an embodiment, the AP 1010 may further include a graphic processing unit (GPU) (not shown).

The communication module 1020 (e.g., the communication interface 160) may perform data transmission/reception in communication with other electronic devices (e.g., the electronic device 104 and the server 106) connected to the electronic device 1000 (e.g., the electronic device 101) through a network. According to an embodiment, the communication module 1020 may include a cellular module 1021, a WiFi module 1023, a BT module 1025, a GPS module 1027, an NFC module 1028, and a radio frequency (RF) module 1029.

The cellular module 1021 may provide a voice call, a video call, an SMS service, an Internet service, and the like through a communication network (e.g., LTE, LTE-A, CDMA, WCDMA, UMTS, WiBro, or GSM). Also, the cellular module 1021 may identify and authenticate an electronic device in a communication network by using, for example, a subscriber identification module (e.g., the SIM card). According to an embodiment, the cellular module 1021 may perform at least some of the functions that may be provided by the AP 1010. For example, the cellular module 1021 may perform at least a multimedia control function.

According to an embodiment, the cellular module 1021 may include a communication processor (CP). Further, the cellular module 1021, for example, may be implemented as a SoC. Although the cellular module 1021 (e.g., a CP), the memory 1030, the power management module 1095, and the like are shown as separate elements from the AP 1010 in FIG. 10, the AP 1010 may be implemented to include at least some (e.g., the cellular module 1021) of the aforementioned elements according to an embodiment.

According to an embodiment, the AP 1010 or the cellular module 1021 (e.g., a CP) may load a command or data received from at least one of a non-volatile memory and other elements connected thereto into a volatile memory and process the loaded command or data. Further, the AP 1010 or the cellular module 1021 may store data received from or generated by at least one of other elements in a non-volatile memory.

Each of the WiFi module 1023, the BT module 1025, the GPS module 1027, and the NFC module 1028, for example, may include a processor for processing data transmitted or received through the corresponding module. Although the cellular module 1021, the WiFi module 1023, the BT module 1025, the GPS module 1027, and the NFC module 1028 are shown as separate blocks in FIG. 10, at least some (e.g., two or more) of the cellular module 1021, the WiFi module 1023, the BT module 1025, the GPS module 1027, and the NFC module 1028 may be included in one integrated chip (IC) or one IC package according to an embodiment. For example, at least some of processors corresponding to the cellular module 1021, the WiFi module 1023, the BT module 1025, the GPS module 1027, and the NFC module 1028 respectively (e.g., a CP corresponding to the cellular module 1021 and a WiFi processor corresponding to the WiFi module 1023) may be implemented as one SoC.

The RF module 1029 may perform data transmission/reception, for example, RF signal transmission/reception. Although not shown in the drawing, the RF module 1029, for example, may include a transceiver, a power amp module (PAM), a frequency filter, a low noise amplifier (LNA), and the like. Also, the RF module 1029 may further include a component for transmitting/receiving an electromagnetic wave over the air in wireless communication, such as a conductor or a conducting wire. Although FIG. 10 shows that the cellular module 1021, the WiFi module 1023, the BT module 1025, the GPS module 1027, and the NFC module 1028 share one RF module 1029, at least one of the cellular module 1021, the WiFi module 1023, the BT module 1025, the GPS module 1027, and the NFC module 1028 may perform RF signal transmission/reception through a separate RF module according to an embodiment.

The at least one SIM card 1024 may be a card including a subscriber identification module, and may be inserted into at least one slot formed in a certain position of the electronic device. The at least one SIM card 1024 may include unique identification information (e.g., integrated circuit card identifier (ICCID)) or subscriber information (e.g., international mobile subscriber identity (IMSI)).

The memory 1030 (e.g., the memory 130) may include an internal memory 1032 or an external memory 1034. The internal memory 1032, for example, may include at least one of a volatile memory (e.g., a dynamic RAM (DRAM), a static RAM (SRAM), or a synchronous dynamic RAM (SDRAM)) and a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, or an NOR flash memory).

According to an embodiment, the internal memory 1032 may be a solid state drive (SSD). The external memory 1034 may further include a flash drive, for example, a compact flash (CF), a secure digital (SD), a micro secure digital (Micro-SD), a mini secure digital (Mini-SD), an extreme digital (xD), or a memory stick. The external memory 1034 may be functionally connected to the electronic device 1000 through various interfaces. According to an embodiment, the electronic device 1000 may further include a storage device (or storage medium) such as a hard drive.

The sensor module 1040 may measure a physical quantity or detect an operation state of the electronic device 1000 and convert the measured or detected information into an electronic signal. The sensor module 1040, for example, may include at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (e.g., a red, green and blue (RGB) sensor), a biometric sensor 1040I, a temperature/humidity sensor 1040J, a light sensor 1040K, and a ultraviolet (UV) sensor 1040M. Additionally or alternatively, the sensor module 1040, for example, may include an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scanner (not shown), and/or a fingerprint sensor (not shown). The sensor module 1040 may further include a control circuit for controlling one or more sensors included therein.

The input module 1050 may include a touch panel 1052, a (digital) pen sensor 1054, a key 1056, or an ultrasonic input unit 1058. The touch panel 1052 that recognizes a touch input, for example, may include at least one of a capacitive touch panel, a resistive touch panel, an infrared touch panel, and an acoustic wave touch panel. Also, the touch panel 1052 may further include a control circuit. When the touch panel is a capacitive touch panel, it may recognize a physical contact or proximity. The touch panel 1052 may also further include a tactile layer. In this case, the touch panel 1052 may provide a tactile response to a user.

The (digital) pen sensor 1054, for example, may be implemented using a means identical or similar to a means for receiving a touch input from a user or using a separate recognition sheet. The key 1056, for example, may include a physical button, an optical key, or a keypad. The ultrasonic input unit 1058 is a unit that can identify data by generating an ultrasonic signal through an input tool and detecting a sonic wave through a microphone (e.g., the microphone 688) in the electronic device 600, and is capable of wireless recognition. According to an embodiment, the electronic device 1000 may also receive a user input from an external device (e.g., computer or server) connected thereto by using the communication module 1020.

The display 1060 (e.g., the display 150) may include a panel 1062, a hologram unit 1064, or a projector 1066. The panel 1062, for example, may be a liquid crystal display (LCD) or an active matrix-organic light emitting diode (AM-OLED). The panel 1062, for example, may be implemented to be flexible, transparent, or wearable. The panel 1062 may also be incorporated into one module together with the touch panel 1052. The hologram unit 1064 may show a stereoscopic image in the air by using light interference. The projector 1066 may display an image by projecting light onto a screen. The screen, for example, may be located inside or outside of the electronic device 1000. According to an embodiment, the display 1060 may further include a control circuit for controlling the panel 1062, the hologram unit 1064, or the projector 1066.

The interface 1070, for example, may include a high-definition multimedia interface (HDMI) 1072, a universal serial bus (USB) 1074, an optical interface 1076, or a D-subminiature (D-sub) 1078. The interface 1070, for example, may be included in the communication interface 160 shown in FIG. 1. Additionally or alternatively, the interface 1090, for example, may include a mobile high-definition link (MHL) interface, a secure digital (SD) card/multimedia card (MMC) interface, or an infrared data association (IrDA) interface.

The audio module 1080 may provide bidirectional conversion between a sound and an electronic signal. At least some elements of the audio module 1080, for example, may be included in the input/output interface 140 shown in FIG. 1. The audio module 1080, for example, may process sound information input or output through a speaker 1082, a receiver 1084, earphones 1086, or the microphone 1088.

The camera module 1091 is a device that can take both still and moving images, and according to an embodiment, may include one or more image sensors (e.g., a front sensor or a rear sensor, not shown), a lens (not shown), an image signal processor (ISP) (not shown), or a flash (e.g., an LED or xenon lamp, not shown).

The power management module 1095 may manage power of the electronic device 1000. Although not shown, the power management module 1095, for example, may include a power management integrated circuit (PMIC), a charger IC, or a battery or fuel gauge.

The PMIC, for example, may be mounted in an IC or an SoC semiconductor. Charging methods may be classified into wired charging and wireless charging. The charger IC may charge a battery, and may prevent an overvoltage or excess current from being induced or flowing from a charger. According to an embodiment, the charger IC may include a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added for the wireless charging.

The battery gauge, for example, may measure the residual capacity, charge in voltage, current, or temperature of the battery 1096. The battery 1096 may store or generate electricity, and may supply power to the electronic device 1000 by using the stored or generated electricity. The battery 1096, for example, may include a rechargeable battery or a solar battery.

The indicator 1097 may display a specific status of the electronic device 1000 or a part thereof (e.g., the AP 1010), for example, a boot-up status, a message status, or a charging status. The motor 1098 may convert an electrical signal into a mechanical vibration. Although not shown, the electronic device 1000 may include a processing unit (e.g., GPU) for supporting a mobile TV. The processing unit for supporting a mobile TV may process media data pursuant to a certain standard, for example, digital multimedia broadcasting (DMB), digital video broadcasting (DVB), or media flow.

Each of the above described elements of the electronic device according to the present disclosure may be formed by one or more components, and the names of the corresponding elements may vary according to the type of the electronic device. The electronic device according to the present disclosure may include at least one of the above described elements, and may exclude some of the elements or further include other additional elements. Further, some of the elements of the electronic device according to the present disclosure may be coupled to form a single entity while performing the same functions as those of the corresponding elements before the coupling.

The term "module" as used in the present disclosure, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing certain operations, which are now known or will be developed in the future.

According to various embodiments, at least some of the devices (for example, modules or functions thereof) or the method (for example, operations) according to the present disclosure may be implemented by a command stored in a computer-readable storage medium in a programming module form. When the instruction is performed by at least one processor (for example, the processor 120), the at least one processor may perform a function corresponding to the instruction. The computer-readable storage medium may be, for example, the memory 130. At least some of the programming modules may be implemented (for example, executed) by, for example, the processor 120. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

According to various embodiments, a storage medium stores instructions. When the instructions are executed by at least one processor, the instructions execute at least one process. The process includes: obtaining 3-D model information about at least part of a space of a subject included in an image taken by a camera functionally connected to the electronic device; obtaining altitude information about the at least part of a space based on the 3-D model information; identifying at least one characteristic area located at the at least part of a space based on variation of the altitude information; and displaying a visual effect related to movement of an object on a display functionally connected to the electronic device, based on the 3-D model information and the characteristic area.

As described above, various embodiments of the present invention can efficiently re-configure three-dimensional information related to subjects from two-dimensional images at a relatively high rate in operation despite the limited resources.

Various embodiments of the present invention can obtain three-dimensional information related to subjects from a plurality of two-dimensional images taken through a monoscope camera.

Meanwhile, the exemplary embodiments disclosed in the specification and drawings are merely presented to easily describe technical contents of the present disclosure and help the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

The invention claimed is:

1. A method of processing three-dimensional (3-D) information in an electronic device comprising:
    obtaining 3-D model information about at least part of a space of a subject included in an image taken by a camera functionally connected to the electronic device;
    obtaining altitude information about the at least part of a space based on the 3-D model information;
    identifying at least one characteristic area located at the at least part of a space based on variation of the altitude information; and
    displaying a visual effect related to movement of an object on a display functionally connected to the electronic device, based on the 3-D model information and the characteristic area,
    wherein obtaining altitude information comprises obtaining an altitude map including information about a height on a plane of a 3-D model based on the 3-D model transformed based on a depth map including information about a depth from the camera to a surface of the subject.

2. The method of claim 1, wherein identifying at least one characteristic area comprises one of the following:
    identifying the characteristic area as an obstacle when altitude is rapidly increased compared with adjacent space;
    identifying the characteristic area as an uphill when the altitude is gradually increased compared with the adjacent space;
    identifying the characteristic area as a pit when the altitude is rapidly decreased compared with the adjacent space; and
    identifying the characteristic area as a downhill when the altitude is gradually decreased compared with the adjacent space.

3. The method of claim 1, wherein obtaining 3-D model information comprises:
    creating the depth map including information about the depth from the camera to the surface of the subject, by using the image; and
    transforming the at least part of a space to a 3-D model of a set of voxels, by using the depth information.

4. The method of claim 3, wherein transforming the at least part of a space to a 3-D model comprises:
  setting voxel size;
  dividing the at least part of a space into voxels based on the set voxel size; and
  performing discretization by mapping the depth map to the respective voxels of the at least part of a space.

5. The method of claim 4, wherein setting the voxel size comprises:
  monitoring a process speed of obtaining of the 3-D model information and/or a process speed of obtaining of the altitude information; and
  controlling the voxel size based on the process speed.

6. The method of claim 5, wherein controlling the voxel size comprises:
  adjusting a length of the voxel, parallel to an altitude axis (z-axis).

7. The method of claim 6, wherein controlling the voxel size comprises at least one of the following:
  setting, when the process speed is less than a threshold, the voxel in such a way that one edge parallel to the altitude axis (z-axis) is greater than other edges parallel to two other axes (x- and y-axes); and
  setting, when the process speed is more than the threshold, the voxel in such a way that the one edge parallel to the altitude axis (z-axis) is shorter than the other edges parallel to the other two axes (x- and y-axes).

8. The method of claim 1, wherein the transformation to an altitude map comprises:
  determining a domain plane; and
  for at least part of pixel planes in the domain plane, configuring at least one of the following: continuity and position occupied by a 3-D model of the subject in a pixel plane, along an altitude axis.

9. The method of claim 8, wherein obtaining altitude information comprises:
  identifying validity of the altitude information by using continuity information of the altitude map; and
  removing at least part of the altitude information, based on the validity.

10. An electronic device comprising:
  a camera;
  a display; and
  a processor configured to:
  obtain three-dimension (3-D) model information about at least part of a space of the subject included in an image taken by the camera;
  obtain altitude information about the at least part of a space based on the 3-D model information;
  identify at least one characteristic area located at the at least part of a space based on variation of the altitude information; and
  display a visual effect related to movement of an object on the display, based on the 3-D model information and the characteristic area,
  wherein the processor is configured to obtain an altitude map including information about a height on a plane of a 3-D model based on the 3-D model transformed based on a depth map including information about a depth from the camera to a surface of the subject.

11. The electronic device of claim 10, wherein the processor is configured to perform one of the following:
  identify the characteristic area as an obstacle when altitude is rapidly increased compared with adjacent space;
  identify the characteristic area as an uphill when the altitude is gradually increased compared with the adjacent space;
  identify the characteristic area as a pit when the altitude is rapidly decreased compared with the adjacent space; and
  identify the characteristic area as a downhill when the altitude is gradually decreased compared with the adjacent space.

12. The electronic device of claim 10, wherein the processor is configured to:
  create the depth map including information about the depth from the camera to the surface of the subject, by using the image; and
  transform the at least part of a space to a 3-D model of a set of voxels, by using the depth information.

13. The electronic device of claim 12, wherein the processor is configured to:
  set voxel size;
  divide the at least part of a space into voxels based on the set voxel size; and
  perform discretization by mapping the depth map to the respective voxels of the at least part of a space.

14. The electronic device of claim 13, wherein the processor is configured to:
  monitor a process speed of obtaining of the 3-D model information and/or a process speed of obtaining of the altitude information; and
  control the voxel size based on the process speed.

15. The electronic device of claim 14, wherein the processor is configured to adjust a length of the voxel, parallel to an altitude axis to control the voxel size.

16. The electronic device of claim 15, wherein the processor is configured to:
  set, when the process speed is less than a threshold, the voxel in such a way that one edge parallel to the altitude axis (z-axis) is greater than other edges parallel to two other axes (x- and y-axes); or
  set, when the process speed is more than the threshold, the voxel in such a way that the one edge parallel to the altitude axis (z-axis) is shorter than the other edges parallel to the other two axes (x- and y-axes).

17. The electronic device of claim 10, wherein the processor is configured to
  determine a domain plane; and
  configure, for at least part of pixel planes in the domain plane, at least one of the following: continuity and position occupied by a 3-D model of the subject in a pixel plane, along an altitude axis.

18. The electronic device of claim 10, wherein the processor is configured to:
  identify validity of the altitude information by using continuity information of the altitude map; and
  remove at least part of the altitude information, based on the validity.

19. A non-transitory, computer-readable recording medium storing instruction for executing a method of processing three-dimensional (3-D) information in an electronic device that, when executed by a processor of the electronic device, causes the processor of the electronic device to:
  obtain 3-D model information about at least part of a space of a subject included in an image taken by a camera functionally connected to the electronic device;
  obtain altitude information about the at least part of a space based on the 3-D model information;
  identify at least one characteristic area located at the at least part of a space based on variation of the altitude information; and display a visual effect related to movement of an object on a display functionally connected to the electronic device, based on the 3-D model information and the characteristic area, wherein the program, when executed, further causes the processor of the electronic device to obtain an altitude map including information about a height on a plane of a 3-D model based on the 3-D model transformed based on a depth map including information about a depth from the camera to a surface of the subject.

* * * * *